Jan. 2, 1934.  W. B. PLUMMER  1,941,577
HYDROCARBON CONVERSION PROCESS
Filed Aug. 25, 1932
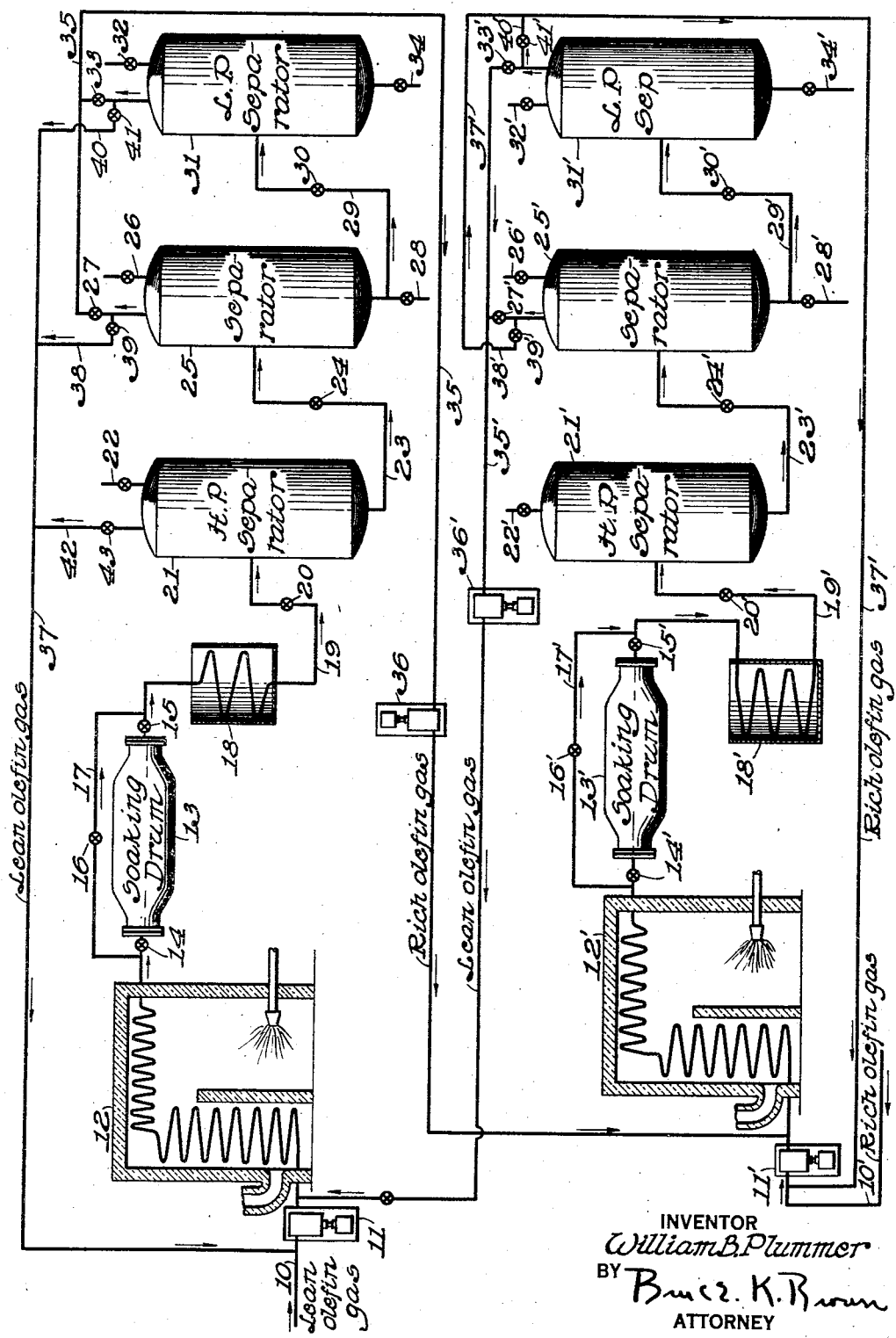

Patented Jan. 2, 1934

1,941,577

UNITED STATES PATENT OFFICE 1,941,577

HYDROCARBON CONVERSION PROCESS

William B. Plummer, Chicago, Ill., assignor to Standard Oil Company, Chicago, Ill., a corporation of Indiana Application August 25, 1932. Serial No. 630,336

4 Claims. (Cl. 196—10)

My invention relates to an improved method for the polymerization of gaseous olefins to form higher boiling liquid products.

It is well known that rich olefinic gases, in other words, gases containing more than 50% of gaseous olefins, can be polymerized at pressures of 500-3000 pounds per square inch and at temperatures of 700° to 950° or 1000° F. It is also known that lean olefinic gases containing less than 50% of gaseous olefins can be polymerized under these same pressures at slightly higher temperatures of about 950-1250° F. Various systems for the polymerization of rich olefinic gases have been proposed, and other systems have been proposed for the polymerization of lean olefinic gases. In both cases it has generally been proposed to recycle all or a part of the unconverted gases which are separated from the liquid products.

I have discovered that in operating systems for the polymerization of rich olefinic gases, the olefins present in the original gas are largely converted to liquid products, and since relatively little or no cracking takes place under these conditions, it is not ordinarily possible to separate from liquid products a recycled gas having a concentration of olefins as high as the original rich gas and hence that direct recycling results in a diluted total feed. On the other hand, I have found that in systems for the polymerization of lean olefinic gases, due to the appreciable amount of cracking (of paraffinic gases present) that takes place simultaneously with polymerization in this temperature range, it is possible to separate from the products a recycled gas having an olefin concentration appreciably higher than the original lean olefin gas. Recycling of such gas to a heater operating under conditions favorable for lean gas polymerization is undesirable, since these conditions are unduly severe (as regards temperature) for the treatment of richer olefin gases.

I have further discovered that by operating a lean gas polymerization system and a rich gas polymerization system in conjunction with each other in the sense that recycled gas separated from liquid products in each system is returned to the heating and reaction section of the other system, very considerable increases in the ultimate yield of products and in the capacity and ease of operation of the given systems may be obtained.

The attached drawing which forms part of this specification represents a diagrammatic elevational view of suitable apparatus for carrying out my improved process.

The basic principle of my invention is clearly set forth by the foregoing brief description. The actual operation of my improved system may be described as follows:

Referring to the drawing, lean olefinic gas may be supplied thru line 10 and compressed by pump 11 to 500-3000 pounds per square inch, whereafter it is heated by heater 12 and caused to react at temeratures of 950-1250° F. Heater 12 may be followed by soaking chamber 13, or if the coils of heater 12 are sufficient in volume so that the reactions are essentially complete at the exit thereof, valves 14 and 15 may be closed whereby soaking chamber 13 is cut out of the system and products leaving the heater 12 pass thru valve 16 in by-pass 17. In either case total products pass thru and are cooled in cooler 18, then passing thru offtake 19 and valve 20 to separator 21, which ordinarily operates at full reaction pressure and from which fixed gases may be withdrawn and eliminated from the system thru vent 22. Liquid products and dissolved gases are drawn off thru 23, the pressure reduced at valve 24 whereby additional quantities of gas are separated in separator 25 which is provided with vent 26 and offtake 27. Liquid products may be drawn off thru 28 or, if desired, a third separator may be provided, in which case separator 25 is operated at an intermediate pressure and liquid products and remaining dissolved gases from 25 pass thru line 29 and valve 30 into separator 31, which is operated at a further reduced pressure and is provided with vent 32 and gas offtake 33, final liquid products being withdrawn thru 34. Gas offtakes 27 and 33 communicate with line 35 and pump 36 whereby rich olefinic gases separated in 25 and/or 31 may be introduced into the inlet of my second polymerization system.

The second polymerization system may be, and is shown as being, identical as regards arrangement with the first system and elements of the second system have the same function and relation to each other as the correspondingly numbered elements of the first system. The second system need not therefore be described in detail. The heater 12' and the soaking drum 13' (if used) operate in the same pressure range of 500-3000 pounds per square inch as the first system, but operate in a lower temperature range of 700-950° F.

In this system gas from separators 25' and/or 31' is of lower olefin content than the rich gas supplied thru 10', and the lean gas from offtakes 27' and/or 33' is therefore passed thru line 35' and pumped by pump 36' to the inlet 10 of the heater 12 of the first polymerization system.

Under some conditions if I make use of a plurality of separators 21, 25, 31, etc. and 21', 25', 31', etc. I may obtain from one of these separators a gas of suitable olefin content to be recycled to the same system, in other words, a gas having essentially the same olefin content as the gas feed to the system. In my two systems I therefore provide recycle lines 37 and 37' returning in each case to the inlet of the same system. Separators 25 and 25' respectively, communicate with lines 37 and 37' thru offtake 38 and valve 39 and offtake 38' and valve 39' respectively. Similarly separators 31 and 31' communicate with 37 and 37' respectively thru offtake 40 and valve 41, and offtake 40' and valve 41' respectively. By this means I may operate my various separators so as to obtain separated gases of both high and low olefin content and may retreat these gases respectively under the polymerization conditions most suited for their particular olefin content. In my first system, i. e. that operating on lean gas, I may also recycle part of the gas separated in high pressure separator 21, which is therefore connected with recycle line 37 by line 42 and valve 43.

It will be evident that my whole system may be operated by supplying both rich olefin gas and lean olefin gas from external sources to the appropriate inlets 10' and 10 of the system or that I may feed my system with either rich olefin gas or lean olefin gas alone, in which case half of the system operates only on recycled gas from the other half of the system without any admixture of corresponding fresh gas. It will also be evident that the heating sections of both systems may be combined in separate coils in one furnace setting suitably disposed in the furnace so that one set of coils receives more heat than the other set.

The operating conditions of high-pressure separators 21 or 21' are subject to the limitation that frequently it is preferable not to operate said separators at pressures above 2,000 lbs. per square inch since at the temperatures attainable with ordinary cooling water, separation of phases is frequently not satisfactory at higher pressures. In case, therefore, that I make use of reaction pressures of above 2,000 lbs. I may reduce pressure to at least that point by valve 20 or 20' prior to high-pressure separators 21 or 21'.

It will be further understood that separators 21, 25 and 31 (and 21', 25' and 31') may be internally equipped with bubble or baffle plates, heating and/or cooling coils, and/or any other means for improving separation therein.

Wherever the following terms are used herein, they are to be understood as having the meaning as defined. By rich olefin gas I mean a gas mixture containing over 50% gaseous olefins by volume. By lean olefin gas I mean a gas containing less than 50% of gaseous olefins by volume. By polymerization at high temperature and high pressure I refer to a system operating at 950-1250° F. and pressures of 500-3000 pounds. By polymerization at low temperature and high pressure I refer to a system operating at 700-950° F. and 500-3000 pounds pressure.

The foregoing, being a full and complete description of my invention, I claim:

1. In the polymerization of olefinic gases to liquid products, the steps of subjecting rich olefinic gas to polymerization at low temperature and high pressure, separating a lean olefinic gas from reaction products of said low temperature system, subjecting said lean olefinic gas to polymerization at high temperature and high pressure, separating a rich olefinic gas from reaction products of said high temperature system, and returning said rich olefinic gas to the inlet of the first named low temperature polymerization system.

2. In the polymerization of olefinic gases to liquid products, the steps of subjecting lean olefinic gas to polymerization at high temperature and high pressure, separating a rich olefinic gas from reaction products of said high temperature system, subjecting said rich olefinic gas to polymerization at low temperature and high pressure, separating a lean olefinic gas from reaction products of said low temperature system, and returning said lean olefinic gas to the inlet of the first named high temperature polymerization system.

3. In the polymerization of olefinic gases to liquid products, the steps of subjecting rich olefinic gas to polymerization at low temperature and high pressure, subjecting lean olefinic gas to polymerization at high temperature and high pressure, separating a lean olefinic gas from liquid products of the low temperature system and a rich olefinic gas from reaction products of the high temperature system, and admixing said separated lean olefinic gas and said separated rich olefinic gas with the corresponding streams of lean olefinic gas and rich olefinic gas supplied to the high temperature and low temperature systems respectively.

4. In the polymerization of olefinic gases to liquid products, the steps of subjecting rich olefinic gas to polymerization at low temperature and high pressure, subjecting lean olefinic gas to polymerization at high temperature and high pressure, separating gases from products in a plurality of stages in each system, withdrawing a lean olefinic gas from at least one separating stage in each system, withdrawing a rich olefinic gas from at least one separating stage in each system, uniting said separated rich olefinic gas from both systems and subjecting said combined rich olefinic gas to polymerization at low temperature and high pressure, uniting said separated lean olefinic gas from both systems, and subjecting said lean olefinic gas to polymerization at high temperature and high pressure.

WILLIAM B. PLUMMER.